(12) United States Patent
Singh et al.

(10) Patent No.: US 11,346,470 B2
(45) Date of Patent: May 31, 2022

(54) METAL BRAIDED HOSE

(71) Applicant: EATON INTELLIGENT POWER LIMITED, Dublin (IE)

(72) Inventors: Dipak Singh, Pune (IN); Ferruh Deveci, Istanbul (TR); Juergen Schmidt, Rastatt (DE)

(73) Assignee: Danfoss Power Solutions II Technology A/S, Nordborg (DK)

( * ) Notice: Subject to any disclaimer, the term of this patent is extended or adjusted under 35 U.S.C. 154(b) by 26 days.

(21) Appl. No.: 16/604,571

(22) PCT Filed: Apr. 12, 2018

(86) PCT No.: PCT/EP2018/059352
§ 371 (c)(1),
(2) Date: Oct. 11, 2019

(87) PCT Pub. No.: WO2018/189278
PCT Pub. Date: Oct. 18, 2018

(65) Prior Publication Data
US 2021/0116058 A1   Apr. 22, 2021

(30) Foreign Application Priority Data

Apr. 13, 2017  (IN) .............................. 201711013268

(51) Int. Cl.
*F16L 11/08* (2006.01)
(52) U.S. Cl.
CPC .................... *F16L 11/086* (2013.01)
(58) Field of Classification Search
CPC ................................................... F16L 11/086

USPC ................................................... 138/127, 134
See application file for complete search history.

(56) References Cited

U.S. PATENT DOCUMENTS

| | | | | |
|---|---|---|---|---|
| 3,463,197 A | * | 8/1969 | Slade | F16L 11/10 138/125 |
| 4,275,937 A | * | 6/1981 | Belofsky | F16L 11/086 138/127 |
| 4,420,018 A | | 12/1983 | Brown, Jr. | |
| 5,343,895 A | * | 9/1994 | King | F16L 11/085 138/125 |
| 6,257,280 B1 | * | 7/2001 | Marena | B29D 23/001 138/125 |
| 6,883,551 B2 | * | 4/2005 | Bourgois | F16L 11/10 138/127 |
| 7,614,428 B2 | * | 11/2009 | Henry | B32B 1/08 138/123 |

(Continued)

FOREIGN PATENT DOCUMENTS

| | | |
|---|---|---|
| CN | 202203539 U | 4/2012 |
| GB | 769374 A | 3/1957 |

(Continued)

*Primary Examiner* — Craig M Schneider
*Assistant Examiner* — David R Deal
(74) *Attorney, Agent, or Firm* — Leydig, Voit & Mayer, Ltd.

(57) ABSTRACT

A metal braided hose includes: an inner tube including an elastic material; a first metal wire braided layer enveloping an outer surface of the inner tube; and a second metal wire braided layer enveloping the first metal wire braided layer. A wire thickness of the second metal wire braided layer is smaller than a wire thickness of the first metal wire braided layer.

6 Claims, 1 Drawing Sheet

(56) References Cited

U.S. PATENT DOCUMENTS 8,356,637 B2 *   1/2013   Gregrich ................ F16L 11/02
                                                              138/125

FOREIGN PATENT DOCUMENTS

| GB | 1270425 A | | 4/1972 |
|----|-----------|---|--------|
| JP | 4212665 B2 | | 1/2009 |
| JP | 2009002519 A | * | 1/2009 |
| JP | 2009002519 A | | 1/2009 |
| RU | 2367835 C1 | * | 9/2009 |
| RU | 2367835 C1 | | 9/2009 |

* cited by examiner

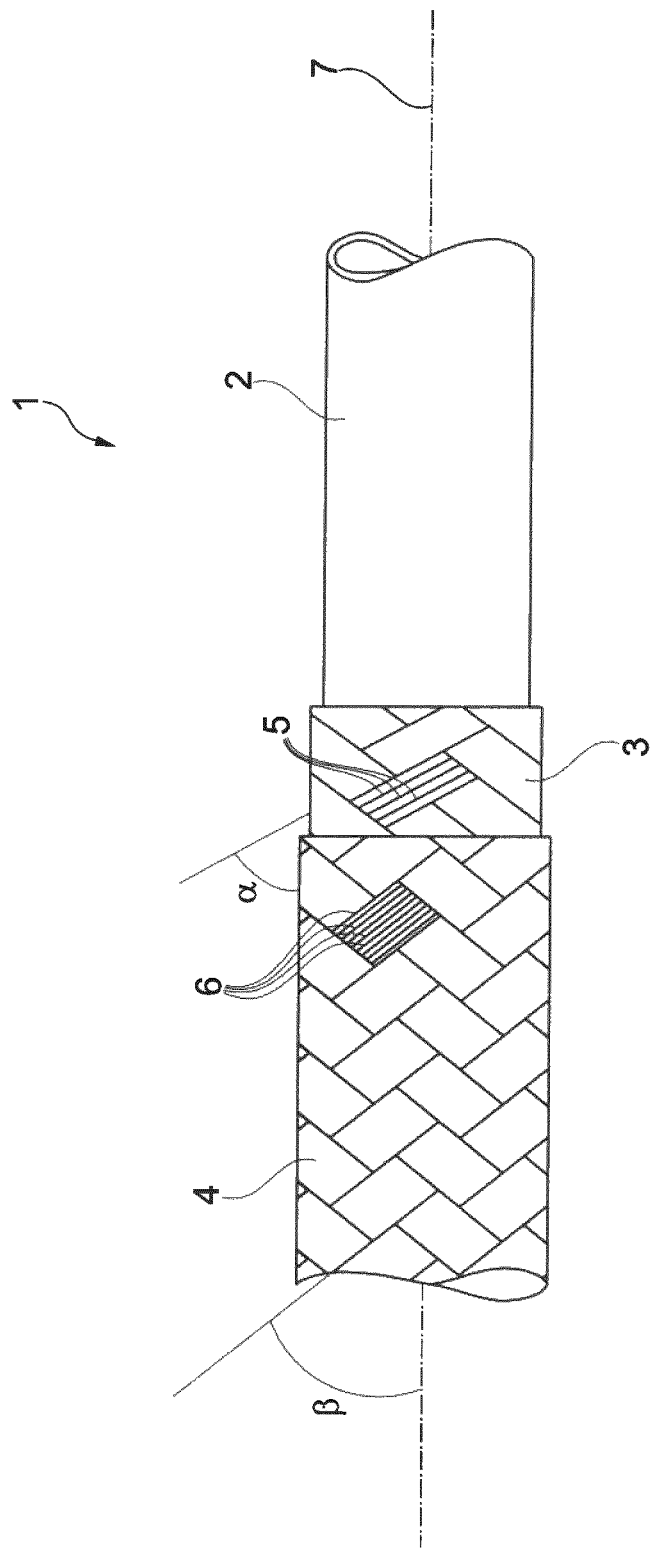

METAL BRAIDED HOSE

CROSS-REFERENCE TO PRIOR APPLICATIONS

This application is a U.S. National Phase application under 35 U.S.C. § 371 of International Application No. PCT/EP2018/059352, filed on Apr. 12, 2018, and claims benefit to Indian Patent Application No. IN 201711013268, filed on Apr. 13, 2017. The International Application was published in English on Oct. 18, 2018 as WO/2018/189278 under PCT Article 21(2).

FIELD

The invention relates to a metal braided hose comprising: an inner tube of an elastic material, such as a synthetic rubber; a first metal wire braided layer enveloping the outer surface of the inner tube; and a second metal wire braided layer enveloping the first metal wire braided layer.

BACKGROUND

Metal braided hoses are typically used in high pressure applications, particularly hydraulic applications. The metal braided layers provide additional strength to the hose, such that it can withstand the high hydraulic pressures. The layers are braided, such that the individual wires can move relative to each other allowing for high flexibility of the hose, despite the metal wires used.

When the hoses are used for hydraulic applications, wherein pressure peaks or impulses generated, for example by suddenly opening or closing a valve in the hydraulic system, the wires of the metal braided layers are subjected to varying stresses. These varying stresses can result in fatigue and earlier failure of the braided layers, when a continuous pressure would be present in the hose. A further cause of fatigue of the wires is due to the bending of the hoses.

GB 769374 describes a hydraulic hose with a number of reinforcement layers in order to withstand high pressures in the hydraulic hose. The thickness of the wires in the different layers increases as the layer is positioned more towards the outside. So, the outer layer has wire with a thickness, which is larger, than the thickness of the wires of the layer arranged more to the inside. The outer layer is even composed out of wires having two different thicknesses and tensile force in order to withstand the desired pressures.

U.S. Pat. No. 4,420,018 shows a hydraulic hose with two reinforcement layers, wherein the braided layers have an open mesh, such that the second layers is partially embedded in the first layer and the overall thickness is reduced, while still sufficient robustness is provided.

It appears however, that despite the number of layers and the increasing thickness of the wires towards the outside of the hose, the metal wires in the outer, second metal wire braided layer still fail due to fatigue.

SUMMARY

In an embodiment, the present invention provides a metal braided hose, comprising: an inner tube comprising an elastic material; a first metal wire braided layer enveloping an outer surface of the inner tube; and a second metal wire braided layer enveloping the first metal wire braided layer, wherein a wire thickness of the second metal wire braided layer is smaller than a wire thickness of the first metal wire braided layer.

BRIEF DESCRIPTION OF THE DRAWINGS

The present invention will be described in even greater detail below based on the exemplary FIGURES. The invention is not limited to the exemplary embodiments. Other features and advantages of various embodiments of the present invention will become apparent by reading the following detailed description with reference to the attached drawings which illustrate the following:

The FIGURE shows a schematic side view of an embodiment of a metal braided hose 1 according to the invention. The hose 1 has a tube 2 of an elastic material, such as a synthetic rubber. A first metal wire braided layer 3 is wrapped around the tube 2, such that the tube 2 is circumferentially enveloped by the layer 3. A second metal wire braided layer 4 is wrapped around the first layer 3.

DETAILED DESCRIPTION

In an embodiment, the present invention provides a metal braided hose, in which the above mentioned disadvantages are reduced.

In an embodiment, the wire thickness of the second metal wire braided layer is smaller than the wire thickness of the first metal wire braided layer.

The applicant has found, that if the wire thickness of the second layer is smaller than the wire thickness of the first layer, the metal braided hose as a notable longer durability than metal braided hoses according to the prior art.

By reducing the wire thickness of the outer layer, the larger part of the stress is taken up by the first layer, while the second layer provides a support layer against bending fatigue for the first layer. This is contrary to the general knowledge, which teaches to increase the wire thickness, for each layer positioned more to the outside.

By having the thicker wires more on the inside of the hose, the hose is also relative more flexible.

In a preferred embodiment of the metal braided hose according to the invention the wire angle relative to the longitudinal axis of the tube in the first metal wire braided layer is larger than the wire angle relative to the longitudinal axis of the tube in the second metal wire braided layer.

By having a difference in the braiding angle between the first layer and the second layer, it is ensured, that the wires of the second layer cross the wires of the first layer and provide their supporting action.

Preferably, the wire angle (or braiding angle) of the second metal wire braided layer is in the range of 51°-55° and wherein the wire angle (or braiding angle) of the first metal wire braided layer is in the range of 55°-59°.

In yet another embodiment of the metal braided hose according to the invention the wire thickness of the second metal wire braided layer is at least 0.1 mm smaller than the wire thickness of the first metal wire braided layer.

By having the wire thickness of the outer layer at least 0.1 mm smaller, a more flexible is provided on the outside, which easily forms to the shape of the first layer. This allows for the second, outer layer to support the first, inner layer and to extend the durability of the whole metal braided hose.

In a very preferred embodiment of the metal braided hose according to the invention the wire thickness of the first metal wire braided layer is 0.5 mm.

With the invention it is possible to use 0.5 mm thick wires for the first metal wire braided layer for metal braided hoses, which are being used as hydraulics hoses for impulse applications. With the prior art, the use of 0.5 mm thick wire would typically lead to a low durability and quick failure of the hose. So, in the field of hydraulic hoses for impulse applications, the thickness of the wires is typically always chosen smaller than 0.5 mm as a person skilled in the art knows that using thicker wire will lead to a reduction of durability instead of an increase. However, with the invention, the second, outer metal wire braided layer having a smaller wire thickness than the inner layer, provides a support layer and increases the durability, such that the resulting metal braided hose can be used at higher pressures, without detracting from the durability.

Preferably, the wire thickness of the second metal wire braided layer is 0.38 mm or smaller in combination with a wire thickness of 0.5 mm for the first metal wire braided layer.

The first metal wire braided layer 3 is build out of metal wires 5, while the second metal wire braided layer 4 is build out of metal wires 6. As schematically shown, the wires 5 have a larger thickness than the wires 6.

Furthermore, the wires 5 of the first metal wire braided layer 3 make an angle α with the longitudinal axis 7 of the metal braided hose 1. The wires 6 of the second metal wire braided layer 4 make an angle β with the longitudinal axis 7. The angle α is larger than the angle β, such that the wires 6 cross with the wires 5 and accordingly the second layer 4 provides a support for the layer 3 with the thicker wires 5.

Comparative test were done with a standardized hydraulic impulse test, wherein only the wire thickness of the first layer 3 and second layer 4 were varied.

| First layer | Second layer | Impulse condition | Impulse cycles | Result |
|---|---|---|---|---|
| 0.5 mm | 0.38 mm | 372 bar, 100 mm bend radii | 430,000 | No failure |
| 0.5 mm | 0.5 mm | 372 bar, 150 mm bend radii | 52,000 | Hose Burst failure |
| 0.38 mm | 0.38 mm | 372 bar, 100 mm bend radii | 290,000 | Socket skirt failure |
| 0.38 mm | 0.3 mm | 426 bar, 90 mm bend radii | 1,000,000 | Socket skirt failure |
| 0.3 mm | 0.3 mm | 426 bar, 90 bend radii | 175,000 | Socket skirt failure |

What becomes clear from these tests, is that when the wire thickness of the second, outer layer 4 is substantially smaller than the wire thickness of the first, inner layer 3, the durability is significant higher.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A metal braided hose, comprising:
   an inner tube comprising an elastic material;
   a first metal wire braided layer enveloping an outer surface of the inner tube and comprising first braided wires; and
   a second metal wire braided layer enveloping the first metal wire braided layer and comprising second braided wires,
   wherein a wire thickness of the second metal wire braided layer is smaller than a wire thickness of the first metal wire braided layer, and
   wherein a wrap angle of the first braided wires relative to a longitudinal axis of the inner tube in the first metal wire braided layer is larger than a wrap angle of the second braided wires relative to the longitudinal axis of the inner tube in the second metal wire braided layer.

2. The metal braided hose according to claim 1, wherein a wire thickness of the second metal wire braided layer is at least 0.1 mm smaller than a wire thickness of the first metal wire braided layer.

3. The metal braided hose according to claim 1, wherein a wire thickness of the first metal wire braided layer is 0.5 mm.

4. The metal braided hose according to claim 3, wherein a wire thickness of the second metal wire braided layer is 0.38 mm or smaller.

5. The metal braided hose according to claim 1, wherein the elastic material comprises a synthetic rubber.

6. A metal braided hose, comprising:
   an inner tube comprising an elastic material;
   a first metal wire braided layer enveloping an outer surface of the inner tube; and
   a second metal wire braided layer enveloping the first metal wire braided layer,
   wherein a wire thickness of the second metal wire braided layer is smaller than a wire thickness of the first metal wire braided layer,
   wherein a wire angle relative to a longitudinal axis of the inner tube in the first metal wire braided layer is larger than a wire angle relative to the longitudinal axis of the inner tube in the second metal wire braided layer,
   wherein the wire angle of the second metal wire braided layer is in a range of 51°-55°, and
   wherein the wire angle of the first metal wire braided layer is in a range of 55°-59°.

* * * * *